L. EMERSON.
TRACTOR PLOW.
APPLICATION FILED FEB. 7, 1921.
1,422,350.
Patented July 11, 1922.
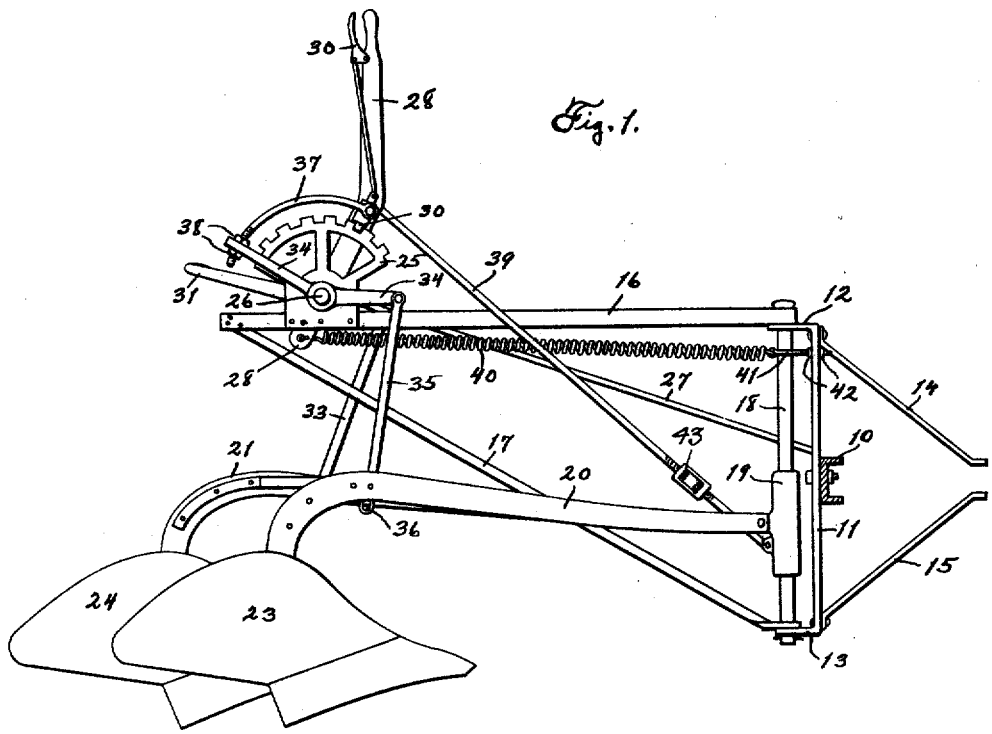
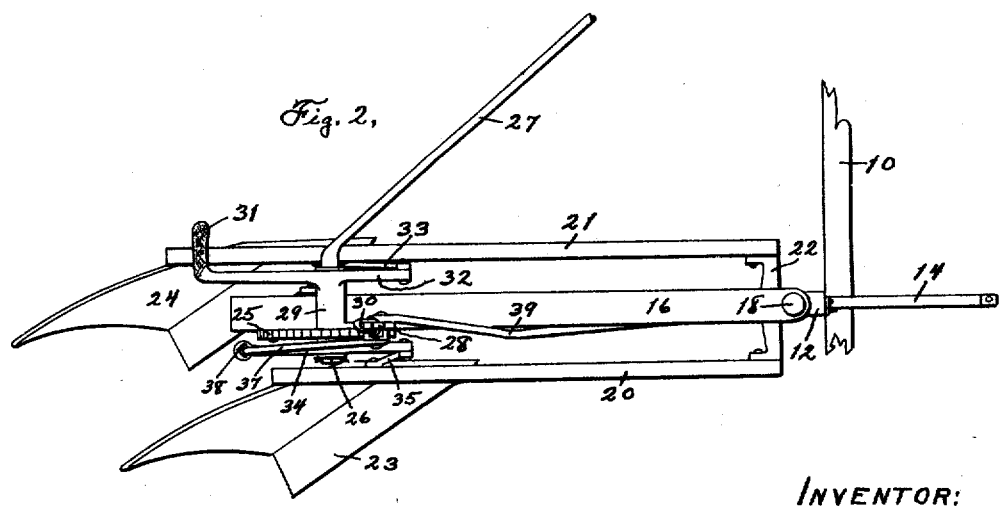
INVENTOR:
L. EMERSON
By Earl M. Sinclair
Atty.

UNITED STATES PATENT OFFICE.

LAWERENCE EMERSON, OF PERCY, IOWA.

TRACTOR PLOW.

1,422,350. Specification of Letters Patent. Patented July 11, 1922.

Application filed February 7, 1921. Serial No. 443,014.

*To all whom it may concern:*

Be it known that I, LAWERENCE EMERSON, a citizen of the United States of America, and resident of Percy, Marion County, Iowa, have invented a new and useful Tractor Plow, of which the following is a specification.

The object of this invention is to provide an improved construction for a tractor plow.

A further object of this invention is to provide improved means for mounting a tractor plow for vertical adjustment.

A further object of this invention is to provide improved means for elevating plow beams and plows relative to a tractor frame.

A further object of this invention is to provide improved escapement means to permit limited independent vertical movement of either plow beam and plow when the plow encounters an obstruction.

A further object of this invention is to provide improved means for adjusting the elevation of one plow beam relative to the other.

With these and further objects in view, my invention consists in the construction, arrangement and combination of elements hereinafter set forth, pointed out in my claims and illustrated by the accompanying drawing, in which—

Figure 1 is a side elevation and Figure 2 a plan view showing my improved tractor frame, a fragmentary portion of a tractor frame being shown as a means for supporting the device.

In the accompanying drawing, the numeral 10 designates the rear cross-frame bar of a tractor of any suitable construction, with which my improved plow is designed to be used. It will be understood that the form and arrangement of the tractor frame and its driving and steering wheels will vary greatly in different makes, and that in some respects my device will have to be altered to meet such differences of construction; but the present disclosure is illustrative and suggestive of such modifications.

A bracket 11 is vertically arranged across and rigidly secured between its ends to the frame bar 10 and said bracket is formed at its ends with rearwardly extending horizontal arms 12, 13. The bracket 11 also is adapted to be suitably braced to the tractor frame by means of inclined, forwardly extending brace members 14, 15, secured at their rear ends to end portions of said bracket. A crane is pivotally secured to and extends rearwardly from the bracket 11, and is composed of an upper member or beam 16, arranged in a horizontal position and overlying at its forward end the upper arm 12 of said bracket and an inclined brace member 17 fixed rigidly at its rear end to the horizontal member 16 and extending forwardly and downwardly to and overlying at its forward end the lower arm 13 of said bracket. The crane is pivotally connected to the bracket 11 by means of a vertically arranged pintle rod or spindle 18 passing through the arms 12, 13 and through forward portions of the crane members 16, 17. A sleeve 19, or tubular clevis, is slidably mounted on the spindle 18, and to said sleeve are pivotally connected, on a transverse horizontal axis, the forward ends of spaced plow beams 20, 21, which beams are connected at their forward ends by a cross-bar 22 and carry at their rear ends suitable bottoms 23, 24.

A quadrant 25 is rigidly secured to the rear end portion of the crane member 16 and carries at its center a transversely arranged spindle 26, one end of which is extended laterally as a brace 27 and secured to a suitable part of the tractor frame. A hand lever 28 is fulcrumed on the spindle 26, preferably being formed with an elongated hub or sleeve portion 29 journaled on said spindle. The lever 28 is formed with suitable detent devices 30 adapted to engage the notched segment or quadrant 25 to hold said lever in any position in which it may be placed manually, and thus govern and determine the elevation of the plow beams and bottoms, as hereinafter more specifically pointed out. A foot lever 31 preferably is formed on and extends rearwardly from the hub 29 of the hand lever, for foot operation in connection with tractors in which the operator's seat is located to the rear of the main frame bar. The hub 29 also is formed with a forwardly extending crank arm 32, and a link 33 pivotally connects the forward end of said crank arm to the rear portion of the plow beam 21. A bell-crank lever 34 is journaled on the spindle 26, in this instance on the opposite side of the quadrant 25 from the lever 28; and the forwardly extending arm of said bell-crank lever is pivotally connected by a link 35 to the rear portion of the plow beam 20. The lower ends of the links 33, 35 preferably have a slotted connection to the plow beams, as shown at 36 in Figure 1, to permit some independent vertical movement of said beams when the bottoms encounter stones or other small obstructions, to prevent injury to the mechanism. A curved rod 37 is pivotally secured at one end to the lower portion of the lever 28, extends rearwardly and passes loosely through the rear arm of the bell-crank lever 34. The rear portion of the curved rod 37 is threaded and adjusting nuts 38 are mounted thereon on opposite sides of the bell-crank lever. Thus the hand lever 28 is operatively and adjustably connected to the bell-crank lever 34, whereby the link 35, as well as the crank arm 32, is oscillated by movement of said hand lever; and the adjustment by means of the nuts 38 provides means whereby the beam 20 with its bottom may be set in desired relation to the beam 21 and its bottom. A link 39 is pivoted at one end to the hand lever 28, at a point above the fulcrum thereof, and extends forwardly and downwardly and is pivotally connected at its opposite end to the sleeve or clevis 19. Thus means is provided for applying lifting strain to the forward ends of the beams 20. 21 coincident with the lifting strain applied to their rear ends through the links 33 and 35, so that said beams are lifted in horizontal position through sliding of the clevis or sleeve 19 on the spindle 18. A tension spring 40 is secured at its rear end to the lower end of the hand lever 28, below the fulcrum thereof, and extends forwardly and is secured to the upper end portion of the bracket 11. This connection preferably is adjustable, to provide means for adjusting the tension of the spring 40, and to this end the spring is secured to an eye-bolt 41, or similar member, passing loosely through the bracket and having adjusting nuts 42 screwed thereon on opposite sides of the bracket. It is the function of the spring 40 to counterbalance the weight of the plow beams and bottoms and assist in the operation of raising said members through the hand lever 28, or foot lever 31; such spring being put under tension when the beams and bottoms are permitted to be lowered through force of gravity, assisted by either of said levers actuated by the operator, upon release of the detent devices 30.

The long link 39 is adjustable in length to adjust the depth of the plows, as by means of a turnbuckle 43 therein.

The plow beams and bottoms may be raised and lowered very easily by manual operation, and are always carried in horizontal position regardless of such adjustment. The plow operates very freely and easily as there is nothing to bind or to tend to lift the bottoms out of the ground.

I claim as my invention—

1. A tractor plow, comprising a frame member, a vertical spindle carried thereby, a member slidably mounted on said spindle, a plow beam secured at its forward end to said sliding member, a support extending rearwardly from said frame member above said plow beam, a lever fulcrumed between its ends on said support, a link pivotally connected at one end to said lever and having a sliding pivotal connection at its opposite end to the rear portion of said plow beam, and a link pivotally connecting said lever to the forward end of said plow beam, the last named link being adjustable as to length.

2. A tractor plow, comprising a frame member, a vertical spindle carried thereby, a member slidably mounted on said spindle, spaced plow beams secured at their forward ends to said sliding member, a support extending rearwardly from said frame member above said plow beams, a horizontal spindle carried by said support, a manual lever fulcrumed on said horizontal spindle, a link pivotally connecting said lever to one of said plow beams, a bell-crank lever fulcrumed on said spindle, a link pivotally connecting one arm of said bell-crank lever to the other of said plow beams, and adjustable connections between said manual lever and the other arm of said bell-crank lever.

3. A tractor plow, comprising a frame member, a vertical spindle carried thereby, a member slidably mounted on said spindle, spaced plow beams secured at their forward ends to said sliding member, a support extending rearwardly from said frame member above said plow beams, a horizontal spindle carried by said support, a manual lever fulcrumed on said horizontal spindle, a link pivotally connecting said lever to one of said plow beams, a bell-crank lever fulcrumed on said horizontal spindle, a link pivotally connecting one arm of said bell-crank lever to the other of said plow beams, the other arm of the bell-crank lever being apertured, a curved rod pivoted at one end to said manual lever and extending loosely through the aperture of said bell-crank lever, said rod being threaded, and nuts mounted adjustably on said curved rods on opposite sides of said bell-crank lever.

Signed at Percy, in the county of Marion and State of Iowa, this 6th day of January, 1921.

LAWERENCE EMERSON.